United States Patent

Kleber et al.

[11] 4,100,078
[45] Jul. 11, 1978

[54] SECONDARY ETHERAMINE ACETATES AND THEIR USE AS LUBRICATING AGENTS FOR SYNTHETIC FIBERS

[75] Inventors: Rolf Kleber, Neu-Isenburg; Willi Steckelberg, Hofheim, Taunus, both of Fed. Rep. of Germany

[73] Assignee: Hoechst Aktiengesellschaft, Frankfurt am Main, Fed. Rep. of Germany

[21] Appl. No.: 748,968

[22] Filed: Dec. 9, 1976

[30] Foreign Application Priority Data

Dec. 12, 1975 [DE]  Fed. Rep. of Germany ....... 2555896

[51] Int. Cl. ................................. D06m 13/18
[52] U.S. Cl. ...................... 252/8.9; 8/115.6; 252/49; 252/52 A; 260/501.11
[58] Field of Search ................ 252/8.9, 8.6, 49, 52 A; 8/115.6 A; 260/501.11

[56] References Cited

U.S. PATENT DOCUMENTS 3,338,830  8/1967  Stokes et al. ........................ 252/8.9

FOREIGN PATENT DOCUMENTS 581,325  8/1946  United Kingdom .................. 252/8.9

*Primary Examiner*—William E. Schulz
*Attorney, Agent, or Firm*—Connolly and Hutz

[57] ABSTRACT

Secondary etheramine acetates of the formula

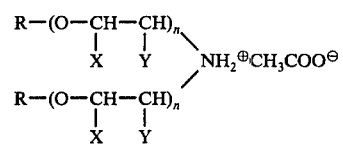

in which R is alkyl or alkenyl having from 7 to 24 carbon atoms, cyclohexyl or aryl optionally substituted by alkyl, X and Y represent hydrogen or methyl, but are not both methyl at the same time, and $n$ is an integer in the range of from 2 to 20. They are obtained by reacting secondary etheramines of the general formula

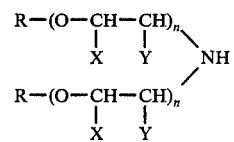

in which R, X, Y and $n$ are defined as above, with glacial acetic acid. These compounds are used as lubricating agents in the preparation and processing of synthetic fibers.

4 Claims, No Drawings

SECONDARY ETHERAMINE ACETATES AND THEIR USE AS LUBRICATING AGENTS FOR SYNTHETIC FIBERS

The present invention relates to secondary etheramine acetates and their use as lubricating agents for synthetic fibers.

When considering the composition of lubricating agents, it becomes evident that as a rule multi-component systems are predominantly used. The reason for this is to be seen in the fact that a lubricating agent for synthetic fibers (staple and endless fibers) has to meet several requirements in most cases, which is effected only by multi-component systems. According to Lindner, Tenside-Textilhilfsmittel-Waschrohstoffe, vol. II, p. 1599 (1964), a preparation for endless filaments has to effect a high compactness of the thread, to regulate the sliding properties at the filament-filament guiding device and to soften the thread. Linder, (loc. cit.) holds the opinion that these different tasks can only be fulfilled by multi-component systems. In these systems, the mineral oil content is mostly predominant according to the author. Other lubricants are solid hydrocarbons, waxes, natural and synthetic triglycerides. In order to apply the mineral oils which are insoluble in water, emulsifying agents are added, in most cases syntheic non-ionic and anionic products and/or soaps. As antistatic components, there are added ethylene oxide condensation products, phosphoric acid ester and, more rarely, cationic compounds (loc.cit.).

However, the modern processing machines, for example, the texturizing machines, have caused the requirements, to be met by the lubricating systems with regard to their thermal stability to become higher and higher. Thus, German Offenlegungsschrift No. 2,441,108 describes textile lubricating agents which contain ester oils as lubricants, so as to make it possible to perform the texturizing, for example, at high temperatures. As advantages of these ester oils (alkylidenetrimethanolester plus diesters of dicarboxylic acids) there are to be mentioned their thermostability and good friction values. However, also these compounds can only be used as multi-component systems and require additional emulsifying agents and antistatic agents in order to impart good sliding properties to the threads and to be applicable from water at all.

However, one of the greatest problems of these multi-component systems is to be seen in the fact that the components, which need to be removed prior to the processing of the fibers, for example dyeing, pollute the waste water with mixtures of oils, mineral oils, ester oils and emulsifying agents, which are difficult to eliminate.

Attempts to develop so-called mineral oil-free systems for these lubricating systems have failed in most cases because the required sliding friction parameters as well as the antistatic and heat-resistant properties have not been met in a manner analogous to that for oil-containing multi-component systems.

It was a surprising fact which could not have been foreseen that a mono-component lubricating system can be obtained which is heat-resistant, which shows good sliding properties and antistatic values, and which can be applied from an aqueous solution without emusifying agents, if the acetates of secondary etheramines of the formula I are used

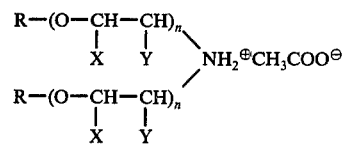

in which R is alkyl or alkenyl having from 7 to 24 carbon atoms, a cyclohexyl radical or an aryl radical optionally substituted by alkyl groups, X and Y represent a hydrogen atom or a methyl radical, but are not both methyl at the same time, and $n$ is an integer in the range of from 1 to 20. Preference is given to those compounds of the formula I, in which X and Y are hydrogen atoms. As an aryl group, unsubstituted phenyl or phenyl substituted by one branched or linear alkyl chain with 8 – 10 C-atoms is preferred.

Thus, the present invention provides secondary etheramine acetates of the above formula I, their preparation and their use as conditioning agents for synthetic fibers.

The acetates of the secondary etheramines of the formula I are obtained by reacting the corresponding etheramines with the equivalent amount of glacial acetic acid. However, it may be advantageous to carry out the reaction with an amount that is smaller or greater than the equivalent amount of glacial acetic acid, in order to optimize the pH value and the solubility of the products in water. In those cases in which glacial acetic acid is used in an amount less than equivalent, the compounds of the invention process contain naturally, besides the acetates, a determined amount of free etheramines. These etheramines may be prepared by the aminolysis of oxalkylates of the general formula II

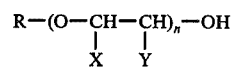

In which R, X, Y and $n$ are defined as in formula I, in the liquid phase with ammonia and hydrogen in the presence of hydrogenation-dehydrogenation catalysts, especially nickel and cobalt catalysts, at a gas rate of at least 10 l/kg of oxalkylate per hour, at a temperature of from 150° to 250° C, and at a pressure of from 0.5 to 1.5 atmospheres (German Patent Application No. P 25 55 895.6).

The alkyl radical R may be straight-chained or branched and is derived from a corresponding alcohol, such as heptanol, isononyl alcohol, lauryl alcohol, isotridecyl alcohol, oleyl alcohol, stearyl alcohol, moreover, from mixtures of these alcohols, particularly those which are formed in the hydrogenation of natural fatty acids and/or their esters, for example, tallow fat alcohols, palm nut alcohols and coconut oil alcohols. Further alcohols, from which the radical R may be derived, are those which are formed in technical processes, for example the Ziegler process (ethylene synthesis process), which yields saturated primary alcohols having a straight carbon chain with up to about 24 carbon atoms, and in the various oxo processes which produce alcohols that are more or less branched.

The oxalkylene group

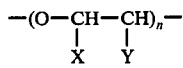

is derived from ethylene or propylene oxide and is introduced by the reaction of an alcohol with ethylene- and/or propylene oxide. In this process it is also possible to use mixtures of ethylene oxide and propylene oxide, or the reaction may be carried out successively with ethylene oxide and propylene oxide or vice versa.

The secondary etheramine acetates of the formula I show a high thermostability and resist to texturizing conditions in the temperature range of from 230° to 250° C without turning yellow, although the oxethylated alcohols being at their basis are already markedly volatile at temperatures of less than 200° C. The secondary ether amineacetates are applied onto the fiber to be conditioned, such as PES, PA, PAC, polyolefins, in known manner from an aqueous solution or as a pure product by dipping, spraying, padding or by means of lick rollers, in which process the applied amount for filaments should be in the range of from 0.3 to 2.0, preferably 0.6 to 1.2%, for staple fibers from 0.05 to 0.5, preferably 0.1 to 0.3%. Since the parameters may be varied within a broad range, for example the degree of oxethylation of the fat alcohol oxethylate of the carbon chain of the alkyl and/or alkene radical, it is possible to adjust the lubricating system selectively to the respective purpose, for example as texturizing preparation of PES filaments, as weaving titer preparation for PA filaments or as spin-drawing and final conditioning for PAC. The products may further be used as heat-resistant emulsifying systems for other water-soluble lubricants (mineral oils, ester oils) in fiber preparations. As a rule, the secondary amineacetates of the invention are used by themselves, however, it is easily possible to combine them with other lubricating components, such as the oils and ester oils as emulsifying agents, as has been mentioned above, or with antistatic agents or phosphoric acid esters.

The following Examples serve to illustrate the invention.

EXAMPLE 1

The following compositions were prepared for a texturizing titer (dtex 167f32) of PES:

(a)
German Offenlegungsschrift No. 2.326.966 Example 1a (as a comparison)
60 Parts of paraffin oil (viscosity at 20° C: 295 cP)
30 parts of oleyl alcohol + 7 parts of ethylene oxide
10 parts of coconut-alkyl-dimethylaminoxide (b)
Example 1b (German Offenlegungsschrift No. 2.326.966) (as a comparison)
60 Parts of paraffin oil (as above)
30 parts of oleyl alcohol + 7 parts of ethylene oxide (= EO)
10 parts of lauryl alcohol-triphosphate (c)
43 Parts of pentaerythritol-tetradecylate (as a comparison)
52 parts of emulsifying agent consisting of:
6 parts of oleyl alcohol + 5.5 parts of ethylene oxide
1 part of POCl$_3$ ester of oleyl alcohol . 8 parts of EO (neutralized with NaOH)
1 part of castor oil + 7.5 parts of EO
3 parts of coconut oil acid . 8 parts of EO
1 part of H$_2$O (d) according to the invention)

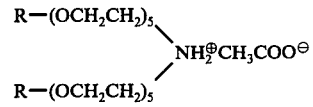

R = coconut-alkyl radical.

The liquid lubricating agents were at first tested for their thermostability and tendency to turn yellow at 220° C:

|   | Loss by evaporation | Yellowing[1] |
|---|---|---|
| a: | 7 % | 80 |
| b: | 28 % | 100 |
| c: | 4 % | 40 |
| d: | 1.8 % | 20 |

[1]Iodine color number: Yellowing according to the test of DIN 6162

The four systems were applied from an aqueous emulsion of about 15% strength (a through c) and/or from a solution (d) by means of a lick roller onto a PES filament (amount applied: about 0.5% of active substance), which was then drawn to 167 dtex. The following texturizing (false-twist texturizing) showed the following results:

|   | tight (non textured) spots | vapors emerging from the heating elements in the texturizing process |
|---|---|---|
| a | 4 | very much |
| b | 6 | much |
| c | 10 | little |
| d (according to the invention) | 0 | none |

The advantages of the composition (d) according to the invention may be seen clearly from the two tests.

EXAMPLE 2

Aqueous solutions of the following products were applied by means of a sponge onto a PA 6 filament (dtex 110f16) with an amount 0.8% and were dried at 105° C.

a: Di-(C$_{12/14}$-akyl-pentaglycol-ether)amineacetate
b: di-(C$_{16/19}$-alkyl-heptaglycol-ether)-amineacetate
c: di-(tallow fat-alkyl-octaglycol-ether)aminecete
d: di(C$_{9/11}$-alkyl-decaglycol-ether)amineacetate
e: di-(C$_{16/20}$-alkyl-tetraglycol-ether)-amineacetate
f: di-(oleyl-pentadecaglycol-ether)-amineacetate
g: di-(oleyl-decaglycol-ether)-amineacetate
h: di-(C$_{20/22}$-alkyl-diglycol-ether)-amineacetate
j: di-(C$_{8/10}$-alkyl-tetraglycol-ether)-amineacetate
k: di-(isotridecyl-triglycol-ether)-amineacetate
l: monolauryl-diphosphate (K-salt) as a comparison.

The filament thus prepared were tested for their friction (sliding friction and/or dynamic friction). The values were measured in a measuring arrangement which has been described in German Offenlegungsschrift No. 2.335.675.

|   | Dynamic filament / metal friction |
|---|---|
| a: | 0.320 – 0.395 |
| b: | 0.350 – 0.410 |
| c: | 0.340 – 0.390 |
| d: | 0.340 – 0.405 |
| e: | 0.325 – 0.355 |

| | Dynamic filament / metal friction | |
|---|---|---|
| f: | 0.250 – 0.305 | |
| g: | 0.260 – 0.305 | |
| h: | 0.245 – 0.300 | |
| j: | 0.255 – 0.300 | |
| k: | 0.355 – 0.390 | |
| l: | 0.355 – 0.425 | as a comparison |

It becomes evident that the phosphoric acid-ester 1), which already shows a very good friction value, is surpassed by all the amineacetates tested with regard to the sliding friction.

When added to a mineral oil in the ratio of 6 parts of oil to 4 parts of amineacetate, the products *a* through *k* were fully compatible and yielded stable emulsions when being emulsified with water, whereas the comparative composition 1) was not compatible with mineral oil and always separated from the mixture.

Preparation of the secondary etheramine acetates

To 200 parts of a secondary etheramine (molecular weight 854) obtained by aminolysis of coconut oilalcohol oxethylated with 5 moles of ethyleneoxide, 15.4 parts of acetic acid (100%) were added under stirring. A product of the formula

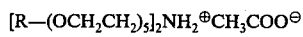
$$[R{-}(OCH_2CH_2)_5]_2NH_2^{\oplus}CH_3COO^{\ominus}$$

was obtained wherein R is the alkyl group of the coconut oilalcohol. This product was easily soluble in water and gave in a 1% aqueous solution a pH value of 5.5.

To 200 parts of a secondary etheramine (molecular weight 493) obtained by aminolysis of a straight chain $C_8$ - $C_{10}$ alcohol oxethylated with 2 moles of ethyleneoxide, 26.8 parts of acetic acid (100%) were added under stirring. A product of the formula

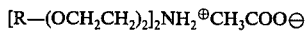
$$[R{-}(OCH_2CH_2)_2]_2NH_2^{\oplus}CH_3COO^{\ominus}$$

was obtained wherein R is a mixture of $C_8$ and $C_{10}$ alkyl. This product was easily soluble in water and gave in a 1% aqueous solution a pH value of 5.2.

In the same way as described above all the etheramine acetates of formula I can be obtained.

What is claimed is:

1. Secondary etheramine acetates of the formula

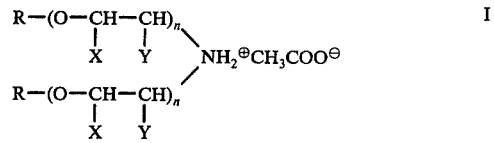

in which R is alkyl or alkenyl having from 7 to 24 carbon atoms, cyclohexyl or aryl optionally substituted by alkyl having from 8 to 10 carbon atoms, X and Y represent hydrogen or methyl, but are not both methyl at the same time, and n is an integer in the range of from 2 to 20.

2. Secondary etheramine acetates as claimed in claim 1, in which X and Y represent hydrogen atoms.

3. Process for the preparation of the secondary etheramine acetates as claimed in claim 1, which comprises reacting a secondary etheramine of the formula

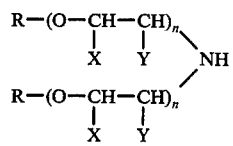

in which R, X and Y and n are defined as in claim 1, with glacial acetic acid.

4. Aqueous lubricating compositions for synthetic fibers consisting essentially of a secondary etheramine acetate as claimed in claim 1.